(12) United States Patent
Moore

(10) Patent No.: US 8,910,295 B2
(45) Date of Patent: Dec. 9, 2014

(54) SECURE CONTENT ACCESS AUTHORIZATION

(75) Inventor: Jonathan Moore, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1033 days.

(21) Appl. No.: 12/956,004

(22) Filed: Nov. 30, 2010

(65) Prior Publication Data

US 2014/0101722 A1    Apr. 10, 2014

(51) Int. Cl.
*G06F 7/04* (2006.01)
*H04L 29/06* (2006.01)

(52) U.S. Cl.
CPC .............. *H04L 63/08* (2013.01); *H04L 63/062* (2013.01); *H04L 63/10* (2013.01)
USPC .......................................................... 726/26

(58) Field of Classification Search
CPC ...... H04L 63/08; H04L 63/0428; H04L 63/12
See application file for complete search history.

(56) References Cited

U.S. PATENT DOCUMENTS

| | | | | |
|---|---|---|---|---|
| 6,208,839 | B1 * | 3/2001 | Davani | 340/7.2 |
| 7,454,018 | B1 * | 11/2008 | Kerigan et al. | 380/200 |
| 2007/0162753 | A1 * | 7/2007 | Nakano et al. | 713/171 |
| 2007/0277233 | A1 * | 11/2007 | Bodin et al. | 726/9 |
| 2008/0177863 | A1 * | 7/2008 | Mohan et al. | 709/219 |
| 2008/0178284 | A1 * | 7/2008 | Harwell | 726/21 |
| 2010/0226525 | A1 * | 9/2010 | Levy et al. | 382/100 |
| 2011/0004929 | A1 * | 1/2011 | Hopkins et al. | 726/9 |
| 2011/0055566 | A1 * | 3/2011 | Norrman et al. | 713/168 |

FOREIGN PATENT DOCUMENTS

CA    2767368 A1 *  2/2011

OTHER PUBLICATIONS

CISCO CDN method: http://www.cisco.com/en/US/docs/video/cds/cda/is/2_0/developer/guide/URLsigning.html, printed Jun. 6, 2011, document undated, but believed to have been published more than a year prior to the filing of the present application.
Amazon Web Services method: https://forums.aws.amazon.com/thread.jspa?threadID=28493&tstart=0, printed Jun. 6, 2011, bearing Jan. 29, 2009 date.
OAuth method: http://oauth.net/core/1.0/; printed Jun. 6, 2011, bearing Dec. 4, 2007 date.
Authentication Overview Netflix WebAPI 1.5, printed Jun. 6, 2011, document undated, but believed to have been published more than a year before the filing of the present application.

* cited by examiner

*Primary Examiner* — Andrew Nalven
*Assistant Examiner* — Mary Li
(74) *Attorney, Agent, or Firm* — Banner & Witcoff, Ltd.

(57) ABSTRACT

A secure content delivery or access method may include coordination among three devices such as servers—a content management server, a delivery server, and an authorization server. A request for content may originate from an authorization server application, and may involve the application obtaining two digitally signed tokens for the request. The first token may be from the authorization server, and may include a content management server identifier for the requested content. The second token may include two identifiers for the content: the first identifier being the content management server identifier, and the second being a delivery server identifier. The first and second tokens may be signed by the authorization server and content management server, respectively, and may be delivered to the delivery server for validation. Successful validation may result in the delivery server providing a content decryption key for the requested content to a device requesting the content.

20 Claims, 5 Drawing Sheets

SECURE CONTENT ACCESS AUTHORIZATION

BACKGROUND

As more and more information content becomes available, more and more demands are placed on content providers to 1) provide users with access to the content; and 2) do so in a controlled manner to preserve security and to preserve their revenue stream. Today, some online sources of content (e.g., providers of streaming video) rely on their own servers for supplying the content, and on their own interfaces (e.g., Internet or web pages) for securing that content. However, as additional distribution entities come online, there is a need for more sophisticated and more secure content distribution authorization methods.

SUMMARY

The features described herein relate generally to securely authorizing access to any type of informational content (e.g., audio data, video data, audiovisual movies, books, encryption/decryption keys for accessing other content, and any other desired type of information). In some embodiments, three server entities may be used. One entity may be a content management device, such as a server, responsible for overall management of content intake and distribution. Another entity can be a delivery device, such as a server, responsible for storage of content, validation of content requests, and delivery of content to validated users. A third entity can be an authorization device, such as a server, which can be an additional server that offers the delivery server's content to a set of users.

In some embodiments, the delivery server may receive a request for content, and the request may include two tokens. One token may be signed by the authorization server, and may contain the content management server's unique identifier for the requested content. This first token may indicate that the authorization server has approved of the requested access. The other token may be signed by the content management server, and may contain both the content management server's unique identifier for the requested content, as well as the delivery server's unique identifier for the requested content. The second token may provide a verified association between the content authorized by the authorization server and the content as stored at the delivery server. With the two tokens, separate entities may be used for delivering and authorizing requests for content.

The delivery server may validate the request in a variety of ways. For example, the delivery server can confirm that the tokens have content identifiers that refer to the same content; the delivery server can check the age of the tokens, or that the tokens are properly signed.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
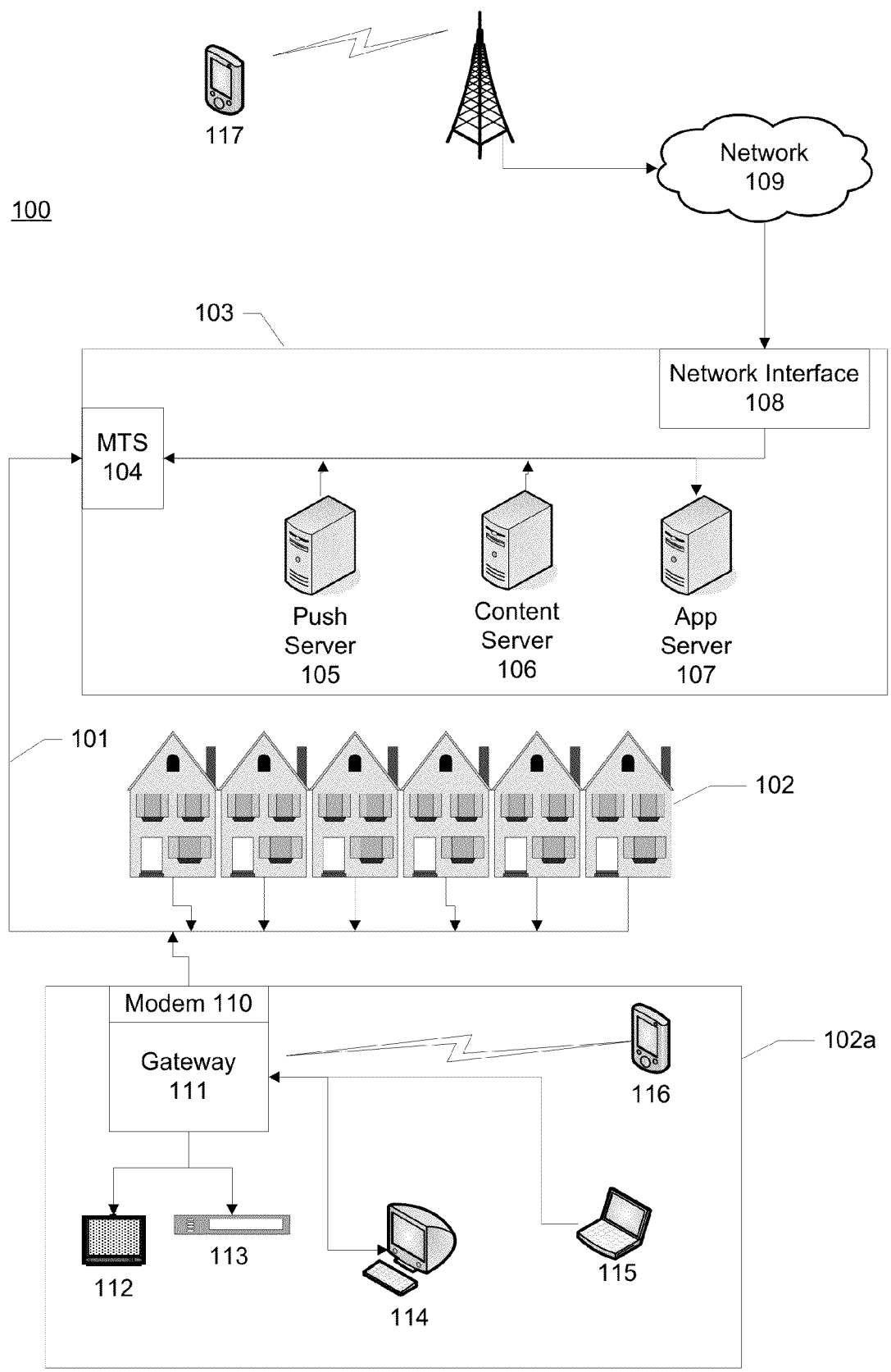
FIG. 1 illustrates an example communication network on which various features described herein may be implemented.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication lines 101 (e.g., coaxial cables, optical fibers, wireless links, etc.) to connect multiple premises 102 (e.g., businesses, homes, consumer dwellings, etc.) to a central office 103 (e.g., a headend, a processing facility, etc.). A content provider, e.g., via a central office 103, may allow access to information or may transmit downstream information signals onto the lines 101, and each premises 102 may have a receiver used to receive and process those signals.

There may be one line 101 originating from the central office 103, and it may be split a number of times to distribute the signal to various premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The various premises 102 may be connected (through wiring and/or wireless connections) to one another, forming a local premises access network operationally distinct from another local access network. The connected homes forming a local premises access network may be located near one another, such as neighboring townhomes, individual apartments in a downtown highrise, or the like. For example, a local premises access network may include the various premises 102. Another group of homes (not shown) may form a separate local premises access network. The local premises access network of the various premises 102 may be identifiable from the separate local premises access network. A local premises access network may also be associated with a particular geographic region (e.g., city, county, geographic area, etc.). In some embodiments, homes connected to a termination system (TS), such as a modem termination system (MTS), may form a local premises access network.

The central office 103 may include a termination system (TS) 104, such as a cable modem termination system (CMTS) in an example of an HFC-type network, which may be a computing device configured to manage communications between devices on the network of lines 101 and backend devices such as servers 105-107 (to be discussed further below). In the example of an HFC-type network, the MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the various premises 102, and to receive upstream communications from those modems on one or more upstream frequencies. The central office 103 may also include one or more network interfaces 108, which can permit the central office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of computing devices, such as servers 105-107, that may be configured to perform various functions. For example, the central office 103 may include a push notification server 105. The push notification server 105 may generate push notifications to deliver data and/or commands to the various premises 102 in the network (or more specifically, to the devices in the premises 102 that are configured to detect such notifications). The central office 103 may also include a content server 106. The content server 106 may be one or more computing devices that are configured to provide content to users in the homes. This content may be, for example, video on demand movies, television programs, songs, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream and/or content item being transmitted to the premises 102.

An example premises 102a may include a modem 110 (or another receiver and/or transmitter device suitable for a particular network), which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to other devices in the home (e.g., user devices), such as televisions 112, additional STBs 113, personal computers 114, laptop computers 115, wireless devices 116 (wireless laptops and netbooks, mobile phones, mobile televisions, personal digital assistants (PDA), etc.), and any other desired devices. (e.g., remote smartphone 117). Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
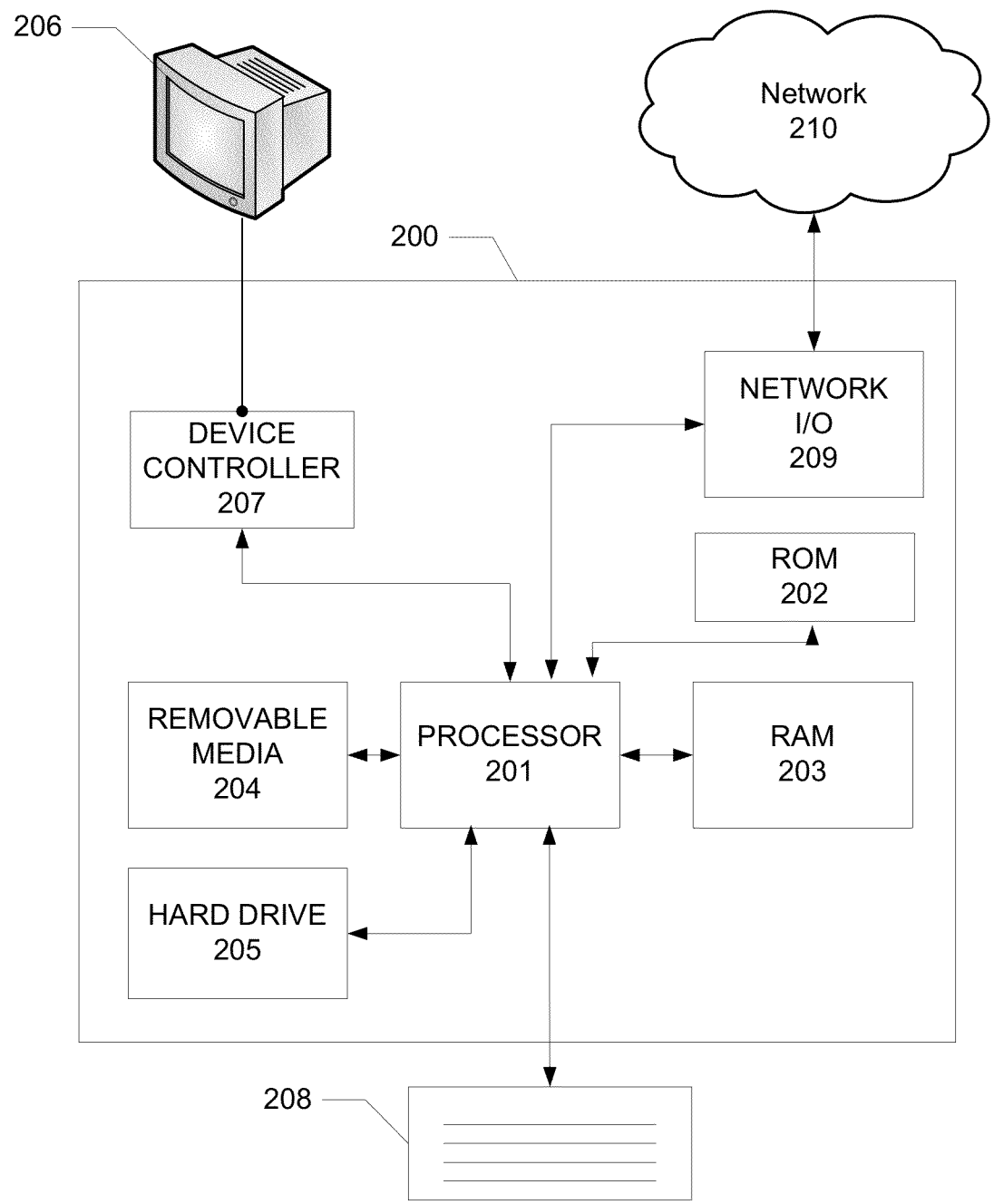
FIG. 2 illustrates an example hardware configuration that can be used to implement the various computing devices and entities described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration (which can include software as well). Modifications may be made to add, remove, combine, divide, etc. components as desired. Additionally, the components illustrated may be implemented using basic computing devices and components, and the same components (e.g., processor 201, storage 202, user interface 205, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

As discussed above, the central office of an information distribution or access network may transmit information downstream to various user devices. The transmitted information may include content for consumption (e.g., playback, viewing, listening, display, storage, etc.) by a user via user equipment, such as a gateway interface device (e.g., gateway interface device 111 of FIG. 1) and/or other computing device (e.g., televisions 112, additional STBs 113, personal computers 114, laptop computers 115, wireless devices 116 of FIG. 1). To assist in providing the content to a user, a content provider may implement in their distribution network an information distribution management system that includes one or more information distribution management devices (e.g., one or more servers and/or other devices) configured to perform various processes related to managing the providing of content to the user equipment (e.g., user device).

For example, such managing may include requesting, creating and handling various sessions (e.g., user sessions, multicast group sessions, cache fill sessions, quality of service sessions); managing transmission of the content (e.g., managing the establishing of transmissions providing unicast content, such as on demand, and linear content, such as multicast content); monitoring usage data of the distribution network, and/or handling requests and notifications from user equipment. As another example, managing may include managing the content discovery, content locating and content delivery processes of the distribution network. In some embodiments, the managing and/or other aspects may be implemented using IP (Internet Protocol) and/or HTTP (Hypertext Transfer Protocol) based processes. For example, communication between various devices may be performed using HTTP and/or IP packets. In one example, a session manager server may locate a streaming server and/or a multicast address for a particular content item, and may notify user equipment of the streaming server and/or multicast address for the particular content item using HTTP or IP packets. The user equipment may receive the particular content item (via, for example, a unicast signal and/or a multicast signal) by receiving HTTP packets that include fragments of the content item and metadata identifying the streaming server and/or multicast address. In some embodiments, communication between devices may use only a single protocol (e.g., only HTTP packets or IP packets). Content items may also be transmitted using the single protocol (e.g., HTTP packets including fragments of content items). Details of these processes, and others, will be discussed in further detail below.

Content discovery processes may include supporting the discovery of content for various content items being provided by or available on a network. For example, content discovery processes may support the discovery of content items for multicast, linear, video on demand, or other type of transmission. In some embodiments, content discovery and the various related processes may use an HTTP-based approach (e.g., communication is via HTTP and/or IP packets) that includes communication between user equipment, application servers, and other various servers of the network.

Content locating processes may include supporting the setup of various sessions and managing the resources of the information distribution network. In some embodiments, content locating processes may enforce entitlement procedures and digital rights management (DRM) licenses. Additionally, in some embodiments, content locating and the various related processes may use an HTTP based approach that includes communication between user equipment, session manager servers, and other servers in and out of the network.

Content delivery processes may include supporting the streaming of the content items from various servers, such as a streaming server of the central office. In some embodiments, content delivery processes may enable user equipment to receive multicast signals (e.g., signals directed at a plurality and/or group of user equipment) and/or receive unicast signals (e.g., signals directed at a specific user device). Additionally, in some embodiments, content streaming and the various related processes may use an HTTP or IP based approach that includes communication between user equipment, content servers, and other servers of the central office.

Figure 3:
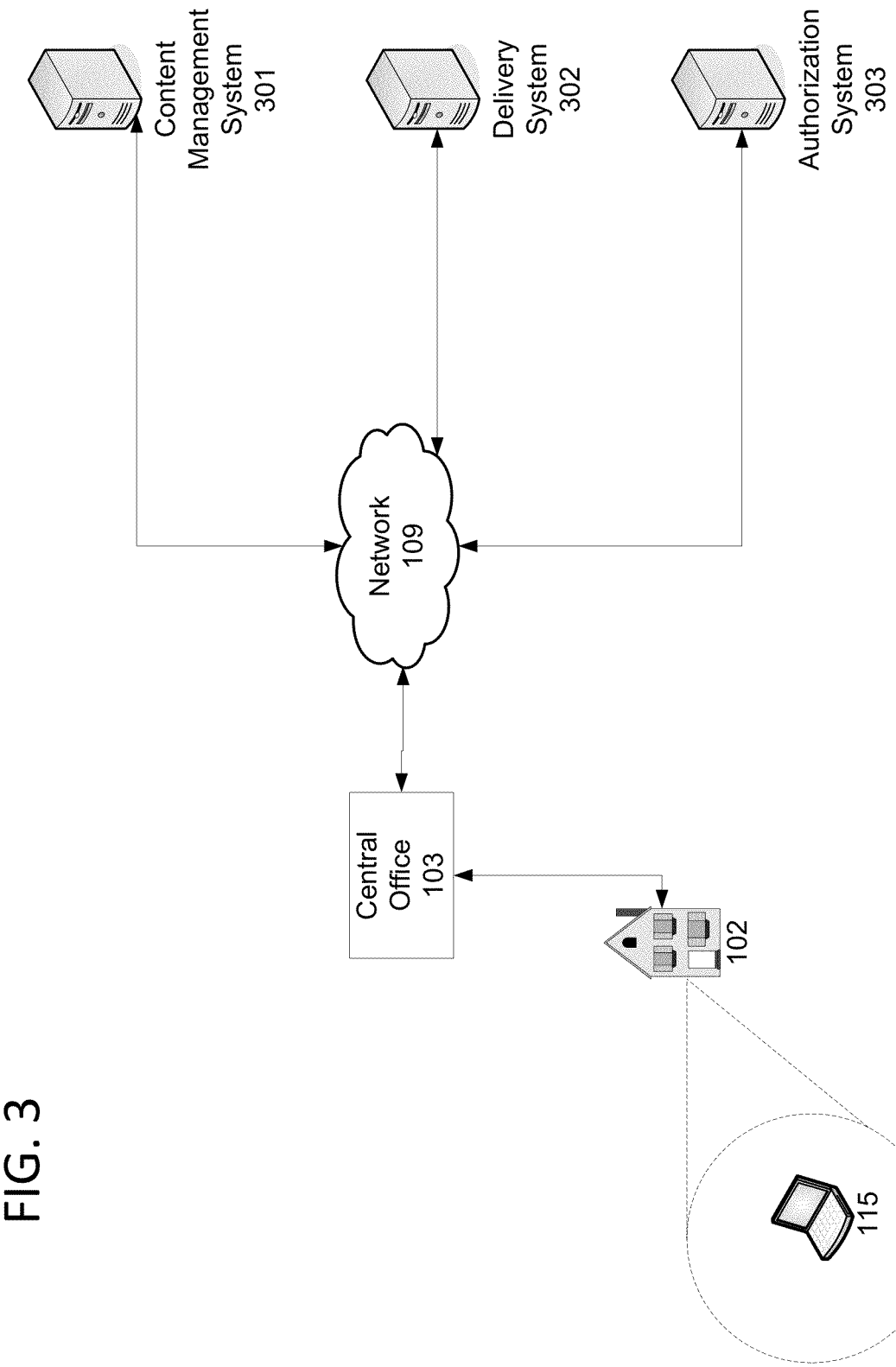
FIG. 3 illustrates an example communication network on which various features described herein may be implemented.

FIG. 3 illustrates an example system of components that may be implemented on the network 100, and which may be used to implement various features described herein to supply or allow access to various content (e.g., audio data, video data, audiovisual movies, books, and any other desired type of information) to users. The system may include premises 102, central office 103 and network 109 as discussed above, as well as a device (e.g., laptop computer 115) within (or outside, or otherwise associated with) the premises that is requesting to access secured content. The system may also include one or more additional computing devices, such as servers that, as discussed below, can operate together to provide access to controlled content. The servers in the examples herein may be any desired type of computing device.

An example system may employ a three-part approach to the handling of secured content. The first part may be a content management server (CMS) 301. The various servers referenced herein may be any type of computing device. The CMS 301 may be a computing device that is configured to initially receive and process content that will be made available to users. For example, a CMS 301 may receive a digital copy of a movie that will be offered on a pay-per-view or on demand basis. The CMS may process the digital copy so that its video is in a suitable format for playback by users (e.g., performing video up/down scaling, color adjustments, audio conversion, language track insertion, close-captioning, three-dimension processing, etc.). The CMS may also encrypt the content for secure access.

The second part may be a delivery server (DS) 302. The DS 302 may receive the encrypted content from the CMS 301, and may store it in a computer-readable medium, such as one or more hard drives, RAID arrays, FLASH memories, optical drives, etc. The DS 302 may authorize access to, and retrieval of, the stored content, and may also provide content decryption keys to authorized recipients of the secured content. The DS 302 may act as a policy enforcement point, validating requests for content by examining tokens as discussed below.

The third part may be an authorization server (AS) 303. The AS 303 may authorize users to receive secured content, and may provide a front-end interface to the users for doing so. For example, the AS 303 may include an Internet server (or device for accessing any other private or public network), and may provide a web page that users can access to request and receive video on demand offerings. For example, a user in the premises 102 may be using laptop 115 to browse an AS 303 web page, and may select one for viewing. The laptop 115 may execute an AS player software program, which can be any desired type of software and/or hardware used to view selections, watch, and/or otherwise access content for a user. Example AS players can be a general web browser (Javascript or Flash client side script, browser plug in, etc.), or a dedicated application. In some embodiments, a web browser plug-in may be installed to add functionality described below. The player can be running on the consumption device (or content receiving device), or it can be running on a different device from the consumption device. The AS 303 may also provide billing services to collect payment for the on demand offerings, for example. The AS 303 may act as a policy decision point, making a determination of whether the request for content is approved by the AS 303.

The three-part system allows flexibility. For example, a single DS 302 can work with multiple different AS 303's, with each AS 303 offering their own users access to the content. Although the various entities (or systems) above (AS 303, DS 302, CMS 301) are described and illustrated separately, they need not be physically separate, and need not have different ownership. For example, a single location and/or provider may operate multiple ones of these entities.

Figure 4A:
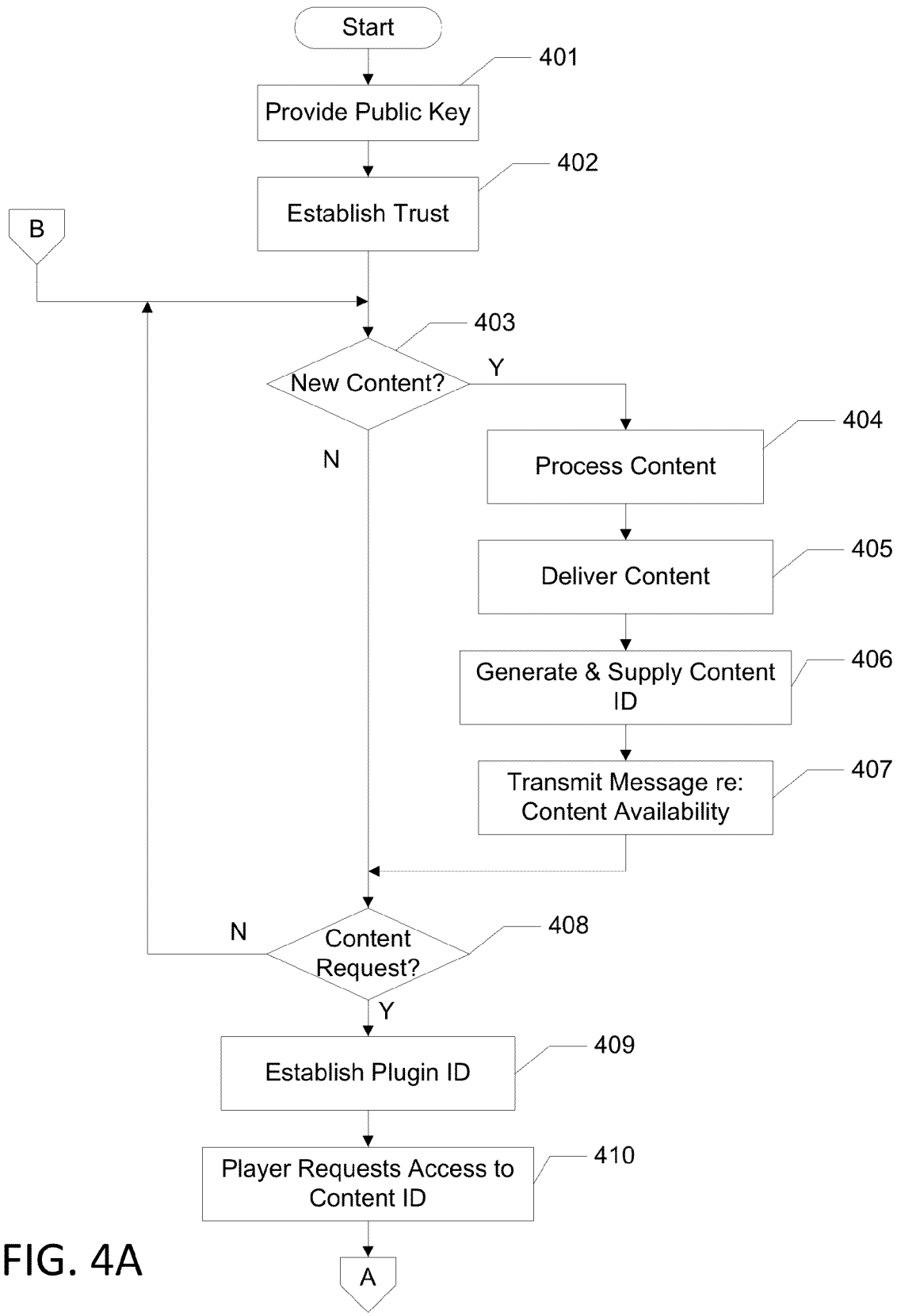
FIGS. 4a&b illustrate an example secure content handling process.

FIGS. 4A&B illustrate an example process by which access to content can be controlled. The various steps may be performed by different entities in the system (e.g., the CMS 301, DS 302 and AS 303), as discussed below. In step 401, the AS 303 may provide its public key to the DS 302. This can occur when the AS 303 is initially installed or activated, or at any desired time in preparation for offering content to users, to establish a level of security with the DS 302 for future transactions. The public key can be of any desired type, compatible with any desired type of public keying infrastructure (PKI) security protocol. For example, the public key can be part of an RSA (Rivest, Shamir, Adleman) public key cryptosystem, and the AS 303 may be configured to encrypt content using an RSA algorithm and sign it with an SHA-1 (Secure Hash Algorithm-1, from the National Institutes of Standards and Technology) algorithm. The public key can establish a level of trust between the AS 303 and a recipient of a message signed and encrypted by the AS 303, using a trusted certificate authority. Other types of shared trust can be used as well. For example, the AS 303 and DS 302 may have a shared secret, and may use a symmetric cryptography digital signature algorithm, such as HMAC-SHA1.

In step 402, the DS 302 and CMS 301 may also establish level of trust between themselves. This level of trust need not be public, however, and may simply be a shared secret using, for example, an HMAC-SHA1 (Hash-based Message Authentication Code using an SHA-1 algorithm) approach. The shared secret between the DS 302 and CMS 301 may allow those two systems to privately authenticate messages transmitted between the two. Alternatively, this shared trust may be a public key cryptography approach, such as that described above between the AS 303 and DS 302.

In step 403, the CMS 301 may determine whether new content is available for processing. This may occur, for example, if a content supplier (e.g., a movie distributor) requests to upload, or otherwise make available, a new piece of content (e.g., a movie) to the CMS 301.

If new content is available, then the CMS 301 may process the content in step 404. The processing may include any desired processing to render the content suitable for access by or download to users. For example, the processing may include encryption, storage and/or format conversion, to generate multiple versions or releases of the content for consumption on different devices. The different releases can be based on the type of coding/decoding (CODEC) capabilities supported by the different consumption devices, different physical capabilities of the consumption devices (e.g., high definition display resolution, standard definition, screen size, color palette, audio channels and speakers, audio range, etc.), transmission bandwidth usable by the different consumption devices (e.g., different data rates for different types of communication lines 101), segmenting content into smaller pieces for ease of delivery, and any other desired processing.

The content (or the various releases thereof) can also be encrypted by the CMS 301. The encryption can be performed using any desired type of encryption algorithm and basis of trust, such as the AES shared secret approach noted above. The resulting releases, and any additional data associated therewith (e.g., encryption details, metadata, etc.) may then be stored by the CMS 301 in any desired storage (e.g., a memory 205). The CMS 301 may also assign each release a unique CMS identifier. An example CMS release identifier for a piece of content may be an ASCII string, such as the following:

"1xY35fRVNImmyK5loj6sXq5X5FFrf4z_"

The processing may also include storing various pieces of data for a given content. For example, the CMS 301 can store a database identifying the various pieces of content, along with metadata for the content identifying the above characteristics. In some embodiments, the CMS 301 may generate a metadata file for the content release, and may store the contents at a location addressable via URL. In some embodiments, the metadata file may be a QMX file.

In step 405, the CMS 301 may deliver one or more of the various pieces of content (e.g., the audio/video content files and any associated metadata) to the DS 302. This transmission may be made, for example, using a shared secret communication between the CMS 301 and DS 302. The CMS 301 can also deliver one or more keys associated with the content. For example, the keys may be content keys that a consuming device will use to decrypt the secured content for playback.

In step 406, the DS 302 may store the content in a memory or persistent storage medium (e.g., hard drive 205), and may maintain a database identifying each release by its release identifier, identifying the physical location in which it is stored at the DS 302 (e.g., the directory path to the location on hard drive 205), and identifying the content key supplied from the CMS 301 for the release. The DS 302 may also generate its own content identifier for the same release, and may transmit the DS content or release identifier back to the CMS 301. The DS release identifier may also be an ASCII string, such as the following:

"BFCDF3E6CA6CEF45543BFBB57509C92A"

Note that the DS release identifier may be a unique identifier for a piece of content (or for a particular version of a piece of content, such as a high-definition version of a movie) that is recognizable by the DS 302, but need not have any meaning to the CMS 301. To the CMS 301, this DS identifier may simply be treated as an opaque string of characters. Conversely, the CMS release identifier may be recognizable by the CMS 301, but may be treated as an opaque string of characters by the DS 302. Upon receipt of the various pieces of information from the DS 302, the CMS 301 may update its database to correlate the DS release identifier with the CMS release identifier for a particular piece of content.

In step 407, the CMS 301 may transmit a message to an AS 303, indicating that the new piece of content (or its various releases) is now available for downloading by users. The message may include the CMS content or release identifier for the new content, or multiple identifiers if multiple releases of the content are made available. The message may include other information about the releases as well (e.g., identifying parameters of the versions of the different releases, identifying consumption device or bandwidth requirements, etc.), and the AS 303 may then update its own records to indicate that the new release(s) is/are available. Various AS players (e.g., software applications running on consumption devices, computers accessing an AS 303 web page, etc.) may then include the new content in listings of available content provided to users, and may receive requests from users to purchase and/or rent the content. For example, a user who has access to or subscribes to a particular AS 303 or an associated website may view listings of available content (e.g., movies, shows, songs, etc.).

In step 408, the AS 303 may determine if a request has been received for a piece of content under its control. This may occur, for example, if the user of device 115 browses the AS 303's web site or another menu and selects a movie for download and viewing on the device 115 as a consumption device. The user may make this request using a web browser, or any other interface (e.g., AS player software) via the device 115 (e.g., a native application for the AS 303 may be executed on the device to allow the user to select offerings and download/decrypt/view them). The overall system may also arrive at this step if, in step 403, there is no new content to add.

If there is a request for content, then in step 409, the AS player (e.g., consumption device 115 running AS player software or accessing an AS web interface—actions described herein by the AS player may be performed by such a consumption device executing the player software) may begin a process to obtain access to the content. In step 409, the AS player may begin by establishing a plug-in identifier, if the player happens to be using a plug-in to interact with the DS 302 (in some embodiments, the player itself may include its own built-in ability to interact with the DS 302, in which case the various plug-in features described herein can be performed by the player itself). The plug-in identifier may identify an instance or installation of a plug-in software program that can be used by the AS player to interact with the DS 302, and can be established using system properties present at time of installation (e.g., hardware identifiers, user IDs, etc.). The plug-in software program may include support for the shared secret level of trust established in step 402, and may handle secure communications with the CMS 301 and DS 302 on behalf of the laptop 115 or AS player. The plug-in identifier itself may be any desired value, such as the following ASCII string:

"5F6E74427BEB63E74ED775C04B0045B3"

Each instance of the plug-in software can be customized for the particular user and/or consumption device. Doing so may help in the recovery of the shared trust between the DS 302 and CMS 301 in the event of a breach involving a plug-in. Accordingly, the identifier above may be unique to a particular user or device. The plug-in software may be installed on the same device running the AS player, and can be used later in step 417 to pass secure information to the DS 302.

In step 410, the AS player can transmit a request to the AS 303, requesting access to the requested content. The request may include the CMS release identifier identifying the requested content, the plug-in identifier, and information identifying the player (e.g., software CODEC (coder/decoder), physical characteristics (e.g., available memory, processing, bandwidth, etc.)) that may be used by the AS 303 in making an access control decision. The request itself may take the form of an HTTP GET request, such as the following:

GET
/data/token?pid=1xY35fRVNImmyK5loj6sXq5X5FFrf4z_
&plugin=5F6E74427BEB63E74ED775C04B0045B3
HTTP/1.1

Host: http://www.authorizationserver.com

Figure 4B:
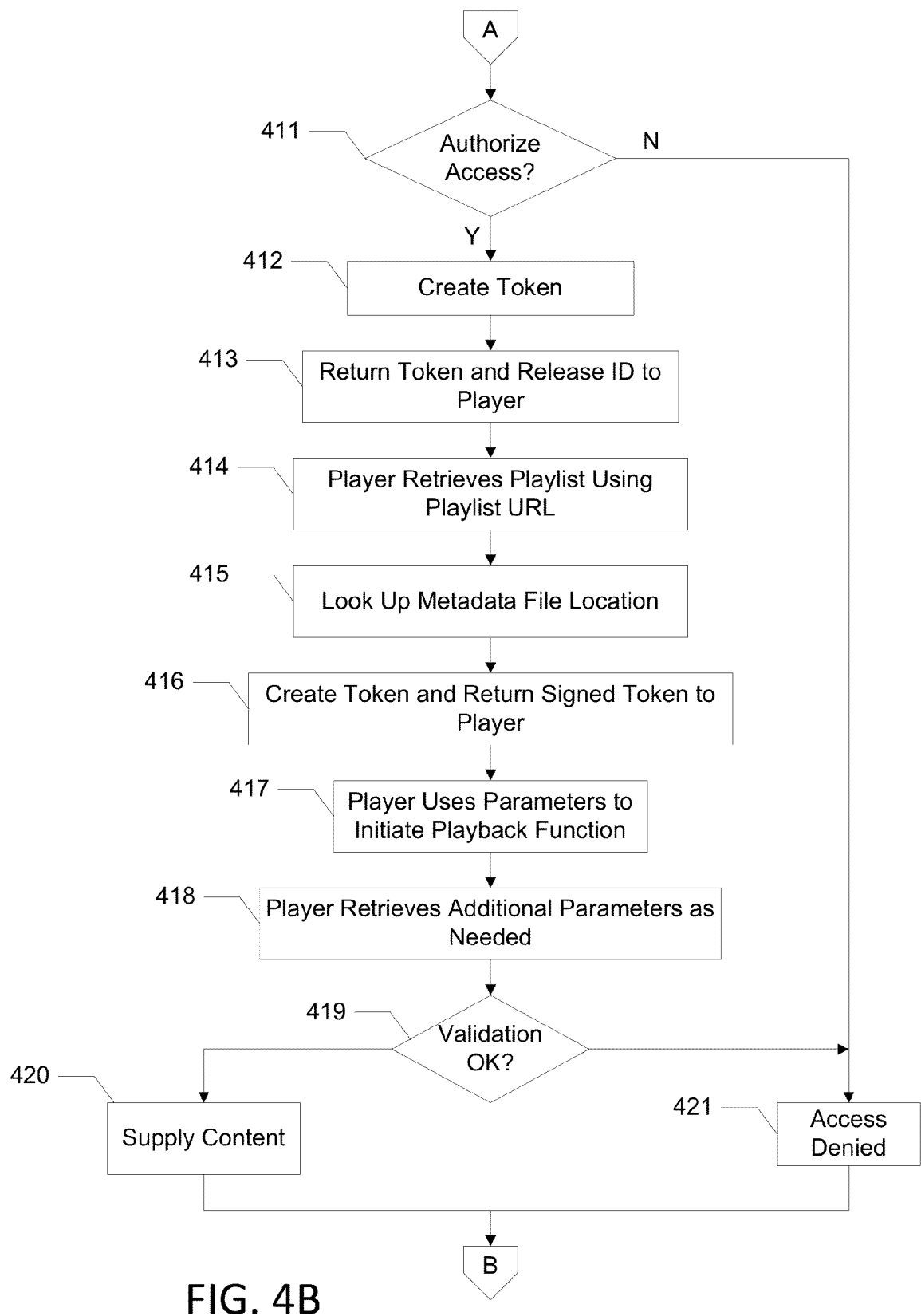

In step 411 (FIG. 4B) the AS 303 may determine whether the particular request for content should be granted, and whether the user is entitled to receive the requested content. The request may also include information identifying the user, such as an HTTP login session cookie, which may be sent by the user's browser along with the request for content. The determination may involve, for example, checking an account profile for the identified user to determine if the user has subscribed to a service level that includes the requested content. For on demand purchases, the AS 303 may consult previously-stored payment information for the user (e.g., identifying a credit card account, bank account, service account, etc.), and debit the appropriate account to pay for the requested content. The AS 303 may also check other parameters to confirm that the request is not prohibited by other user preferences (e.g., age-restricted content, dollar limit, etc.), and if the requested content is compatible with the AS player and/or hardware device making the request.

If the requesting user is permitted to obtain the requested content, the AS 303 may proceed to step 412 and generate an AS token indicating the authorization. The AS 303 authorization token may be a signed version of the request sent by the AS player. For example, the AS 303 may sign the HTTP GET request above (e.g., the "http://www.authorizationserver.com/ . . . ") using an OAuth (Open Authorization) mechanism and the AS 303's own private signing key. An example set of OAuth parameters may include Key Identifier, a Nonce challenge, a Timestamp value, an identification of the signing method (e.g., identifying an algorithm), and a version of OAuth standard. These parameters may be concatenated to form the following string:

[GET]&[URL]&[Key Identifier]&[Nonce]&
[Signature Method]&[Timestamp]&[OAuth Version]&
[ReleaseID]&[PlugInId]

The AS 303 may then sign this string using its signing algorithm and private key, resulting in a signature. The signature can then be appended to the string above as an OAuth_Signature parameter. The resulting string can be the AS 303 authorization token.

In step 413, the AS 303 may return the AS token to the request AS player. In doing so, the AS 303 may also include a release URL identifying a location of the requested content. The AS token may also contain the CMS release identifier value for the requested content (e.g., received in step 407). For example, a release URL and AS token may resemble the following:

http://release.cms.com/select.content?pid=1xY35fRVNImmyK5loj6sXq5X5FFrf4z__&tf=http%3A%2F%2Fwww.authorization
server.com%2Fauth_token%3Fpid%3D1xY35fRVNImmyK5loj6sXq5X5FFrf4z__%26plugin%3D5F6
E74427BEB63E74ED775C04B0045B3%26oauth_consumer_key%3Dauth-2009-02-
24%26oauth_token%3D%26oauth_nonce%3D98765%26oauth_timestamp%3D1235425242%26oaut
h_signature_method%3DRSA-
SHA1%26oauth_version%3D1.0%26oauth_signature%3DMdPSa1p1pWmeghLWs%252BFsRAXiw%25
2FQWtmXRXABsiSB6uHQxB4bZhe00mwoHFlCq6w9LScbAgEs%252Bxv5HjmDDpkkT2aFrjtxu2RXnVDM
Gn2DxNmZVy9EerliS7n06WCaxkmmylgmMd2KZpXWyTTb%252B3M5uCEeW5r2CfL5m69fRI44U96o%25
3D In step 414, the AS player may receive the release URL, and may send a GET request to the CMS 301 using the URL to receive a playlist manifest file (e.g., SMIL file) for the requested content. The manifest file may contain additional metadata information that the player can use to ultimately play back the requested content.

In step 415, the CMS 301 may respond to the GET request, and use the CMS release identifier in the release URL to consult its stored database to identify the corresponding DS release identifier for the version of content being requested.

In step 416, the CMS 301 may generate a string containing both the CMS release identifier and the DS release identifier, and sign it using the shared secret established with the DS 302 in step 402 to result in a CMS token. The signed value can also include a string identifying the location (e.g., a URL) where additional data for the requested content can be located by the DS 302. For example, the additional data can identify a URL where the CMS 301 has stored files, such as a metadata file (e.g., a QMX file), when it processed the content in step 404. The CMS 301 may then send the signed string as the CMS token to the AS player.

In step 417, the AS player may initiate execution of the plug-in for the requested content, and may provide it with various parameters from the CMS 301. For example, the AS player may supply the plug-in with the identification of file location information (e.g., the additional data discussed above, identifying the metadata file location), as well as the two tokens (the AS token and the CMS token). In step 418, the plug-in itself may further process this information to obtain additional parameters. For example, it may retrieve the metadata file from the specified location, and obtain from that file a copy of the CMS release identifier (a value that should also be present in the CMS token). The plug-in may also collect an identifier of the web page that was hosting it (if desired). The plug-in (or the player) may also then transmit some or all of this data (e.g., the AS token and CMS token) to the DS 302 as a request for the content. The request can also include the parameter information discussed above, and may also include added data, such as an identifier of the player and/or plug-in issuing the request.

The DS 302 may respond by beginning a download of the requested content to the requesting device. The AS player can temporarily store (e.g., buffer) the encrypted content, so that it may immediately begin playback after it receives the content decryption key (assuming its request is validated below). Note that although the "content" in this example may be the underlying video, such as a television program that the user selected (e.g., a particular episode of 'Boardwalk Empire'), the requested 'content' may alternatively be the decryption key for that television program, and the program itself (e.g., the actual file containing the video content) may be made freely available but in an encrypted format that would be useless to anyone who did not have the decryption key.

In step 419, the DS 302 may validate the request for content. As part of this validation, the DS 302 may conduct a variety of checks. For example, the DS 302 may obtain the AS 301 public key, and verify that the AS token was indeed signed by the AS 301. If the signature cannot be verified using the public key, then the request may be denied.

The DS 302 may consult the time value in the AS token to determine if the age of the token has exceeded a predetermined age limit. For example, the DS 302 may be configured to place a time limit, e.g., 10 minutes, on AS tokens, and AS tokens can be deemed invalid after the time limit passes. A similar age limit can be established for CMS tokens as well, and can be a basis for rejecting CMS tokens received by the DS 302. If either of these time limits is exceeded, then the request may be invalidated. The DS 302 may also check that the AS token contains the plug-in identifier that corresponds with the player currently making the request (e.g., the plug-in identifier may also be provided separately in the request).

The DS 302 may validate that the CMS token was properly signed by the CMS 301 using the shared secret established between the DS 302 and CMS 301 in step 402. If it was not properly signed, then the request can be invalidated.

The DS 302 may validate that the URL of the page hosting the AS plug-in is in an approved URL pattern. For example, if the request includes an identifier of a hosting web page, the DS 302 can check the web page identification (e.g., its URL) to see if it violates any policies for authorization (e.g., the DS 302 may retain a list of approved domains, so if the hosting domain is unauthorized, the request can be denied).

The DS 302 may also determine whether the CMS token and the AS token both contain the same CMS release identifier for the requested content. If the identifiers are different, then the request may be invalidated.

The DS 302 may determine whether the CMS token contains a CMS release identifier that matches the one supplied in the request sent in step 418. The DS 302 may also perform other validations on the request from the AS player, as dictated by relevant business rules (e.g., purchase cost, user subscription level, etc.).

If all of these checks and validations pass, then the DS 302 may proceed to step 420, and retrieve the content key and content, and transmit both to the requesting AS player and its plug-in. The plug-in itself may place the key in a secure memory area, or otherwise obscure it, to reduce risk of tampering, and can proceed to use the key to decrypt and play back the requested content.

If any of the checks fail, then the DS 302 may proceed to step 421, and return a message indicating that the request is denied. The message may include an indication of which check failed, and the plug-in may cause the AS player (or the hardware on which it is running) to display a denial message to the user, along with one or more options for rectifying the denial.

The illustrated process may then return to step 403 to determine another piece of new content is available, and the loop may continue so long as the system is active.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings.

For example, the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method, comprising:
receiving by a content-delivery device, a request for access to secure content, the request comprising at least two security tokens, wherein a first security token of the at least two security tokens comprises a content management release identifier of the requested secure content signed by an authorization system, and a second security token of the at least two security tokens comprises at least two different identifiers associated with the requested secure content, a first identifier of the at least two different identifiers comprising the content management release identifier of the requested secure content, and a second identifier of the at least two different identifiers comprising a delivery system release identifier of the requested secure content, the at least two different identifiers in the second security token being signed by a content management system;
validating, by the content-delivery device, the request for access; and in response to validating the request, transmitting, to a requesting device, a decryption key for the requested secure content.

2. The method of claim 1, wherein the request for access is received from an authorization system player running on the requesting device.

3. The method of claim 1, wherein the validating comprises confirming that the content management release identifier in the first security token, the content management release identifier in the second security token, and the delivery system release identifier in the second security token all correspond to the secure content.

4. The method of claim 1, wherein the validating comprises verifying that an age of one of the at least two security tokens does not exceed a predetermined time limit.

5. The method of claim 1, wherein the first security token is signed using a public key infrastructure signing key of the authorization system.

6. The method of claim 1, wherein the second token is signed using a shared secret between the content management system and the content-delivery device.

7. The method of claim 1, wherein the first security token comprises a request string containing a uniform resource locator (URL) address.

8. A method of claim 7, wherein the first security token comprises an identifier of a delivery system plug-in instance running on a device that issued the request.

9. The method of claim 1, wherein the second security token comprises a uniform resource locator (URL) address for a metadata file corresponding to the requested secure content.

10. The method of claim 1, wherein the first security token is signed using a shared secret between the authorization system and the content-delivery device.

11. The method of claim 1, wherein the second security token is signed using a public key infrastructure signing key of the content management system.

12. A device, comprising:
a processor; and
a non-transitory computer-readable medium, storing instructions that, when executed by the processor, cause the device to:
receive a request for access to secure content;
identify two security tokens from the request, wherein a first security token of the two security tokens comprises a content management system release identifier of the requested secure content signed by an authorization system, and a second security token of the two security tokens comprises at least two different identifiers associated with the requested secure content, a first identifier of the at least two different identifiers comprising the content management system release identifier of the requested secure content, and a second identifier of the at least two different identifiers comprising a delivery system release identifier of the requested secure content, and each of the at least two different identifiers in the second security token being signed by a content management system;
validate the request for access; and
transmit a decryption key for the requested secure content to a requesting device.

13. The device of claim 12, wherein the validating comprises confirming that the content management system release identifier in the first security token, the content management system release identifier in the second security token, and the delivery system release identifier in the second security token all correspond to the secure content.

14. The device of claim 12, wherein the validating comprises verifying that an age of one of the security tokens does not exceed a predetermined time limit.

15. The device of claim 12, wherein the non-transitory computer-readable medium stores instructions that, when executed by the processor, cause the device to use a public key infrastructure key to verify a signature of one of the tokens.

16. The device of claim 12, wherein the non-transitory computer-readable medium stores instructions that, when executed by the processor, cause the device to verify a signature of the second security token using a shared secret between the content management system and the device.

17. A device, comprising:
a processor; and
a non-transitory computer-readable medium, storing instructions that, when executed by the processor, cause the device to:
send an authorization token request to an authorization system, the authorization token request comprising information identifying a video program;
receive an authorization system token from the authorization system, the received authorization system token comprising a content management release identifier for the video program signed by the authorization system, and comprising a locator address for the video program;
send a content management token request to a content management system, the content management token request comprising the locator address from the authorization system token:
receive a content management token from the content management system, the content management token comprising the content management release identifier and a delivery system release identifier associated with the video program; and send a request to the delivery system, the sent request comprising the authorization system token and the content management token.

18. The device of claim 17, wherein the authorization token request is an HTTP GET request.

19. The device of claim 17, wherein:

the authorization token request comprises a uniform resource locator (URL) identifying the video program using a URL of the authorization system; and the content management token request comprises a URL identifying the video program using a URL of the content management system.

20. The device of claim 17, wherein the non-transitory computer-readable medium stores instructions that, when executed by the processor, cause the device to:

begin retrieving an encrypted version of the video program from the delivery system before receiving the authorization system token and the content management token;

use the authorization system token and the content management token to request a decryption key for the encrypted version of the video program; and receive the decryption key for the encrypted version of the video program after sending the request comprising the authorization system token and the content management token to the delivery system.

* * * * *

UNITED STATES PATENT AND TRADEMARK OFFICE
CERTIFICATE OF CORRECTION

| | |
|---|---|
| PATENT NO. | : 8,910,295 B2 |
| APPLICATION NO. | : 12/956004 |
| DATED | : December 9, 2014 |
| INVENTOR(S) | : Jonathan Moore |

It is certified that error appears in the above-identified patent and that said Letters Patent is hereby corrected as shown below:

In the Specification

Column 12, Detailed Description, Line 13:
  Please delete "301" and insert --303--

Column 12, Detailed Description, Line 14:
  Delete "301" and insert --303--

In the Claims

Column 13, Claim 1, Line 20:
  After "receiving", insert --,--

Column 13, Claim 1, Line 37:
  After "and", insert --¶--

Column 13, Claim 8, Line 61:
  Delete "A" and insert --The--

Column 14, Claim 17, Line 65:
  Delete "token:" and insert --token;--

Signed and Sealed this
First Day of December, 2015

Michelle K. Lee
*Director of the United States Patent and Trademark Office*